(12) United States Patent
Kobayashi

(10) Patent No.: US 7,487,685 B2
(45) Date of Patent: Feb. 10, 2009

(54) STRAIN MEASUREMENT METHOD AND DEVICE

(75) Inventor: Koichi Kobayashi, Tokyo (JP)

(73) Assignee: Kabushiki Kaisha (JP)

( * ) Notice: Subject to any disclaimer, the term of this patent is extended or adjusted under 35 U.S.C. 154(b) by 89 days.

(21) Appl. No.: 11/513,934

(22) Filed: Aug. 31, 2006

(65) Prior Publication Data

US 2007/0044568 A1 Mar. 1, 2007

(30) Foreign Application Priority Data

Sep. 1, 2005 (JP) ............................. 2005-253096

(51) Int. Cl.
*G01L 1/24* (2006.01)
(52) U.S. Cl. ...................... 73/800; 356/35.5
(58) Field of Classification Search ................ 73/800; 356/35.5
See application file for complete search history.

(56) References Cited

U.S. PATENT DOCUMENTS

| | | | |
|---|---|---|---|
| 3,739,697 | A | 6/1973 | Miyagawa |
| 4,591,996 | A * | 5/1986 | Vachon .................. 702/42 |
| 4,798,469 | A | 1/1989 | Burke |
| 4,824,250 | A | 4/1989 | Newman |
| 5,694,480 | A | 12/1997 | Itakura |
| 5,864,944 | A | 2/1999 | Kashiwagi et al. |
| 6,097,477 | A * | 8/2000 | Sarrafzadeh-Khoee ..... 356/35.5 |
| 6,248,994 | B1 | 6/2001 | Rose et al. |
| 6,262,818 | B1 | 7/2001 | Cuche et al. |
| 6,424,407 | B1 | 7/2002 | Kinrot et al. |
| 6,847,910 | B2 | 1/2005 | Kobayashi |
| 7,165,007 | B2 | 1/2007 | Kobayashi et al. |
| 7,257,510 | B2 | 8/2007 | Kobayashi |

| | | | |
|---|---|---|---|
| 2005/0146708 | A1 * | 7/2005 | Shi et al. .................. 356/35.5 |

FOREIGN PATENT DOCUMENTS

| | | | |
|---|---|---|---|
| EP | 629835 | A2 * | 12/1994 |
| JP | 03274402 | A * | 12/1991 |
| JP | 04021255 | | 1/1992 |
| JP | 05143717 | A | 6/1993 |
| JP | 07110216 | A | 4/1995 |
| JP | 09049706 | | 2/1997 |
| JP | 2000149087 | | 5/2000 |

OTHER PUBLICATIONS

Patent and Trademark Office, Office Action mailed Jun. 8, 2004, for U.S. Appl. No. 09/838,905.

(Continued)

*Primary Examiner*—Edward Lefkowitz
*Assistant Examiner*—Freddie Kirkland, III
(74) *Attorney, Agent, or Firm*—Price, Heneveld, Cooper, DeWitt & Litton, LLP

(57) ABSTRACT

A non-contacting strain measurement method and system employs a laser light source for irradiating a test piece to provide a spectral pattern in spaced relationship from the test piece. The pattern is viewed while the test piece is placed under tension by a plurality of video cameras. The CCD video cameras are coupled to signal processing circuits which calculate the Poisson ratio according to the formula:

$$\varepsilon_{xx} = -\frac{\Delta A_x}{2L_0 \tan\theta_0}.$$

18 Claims, 3 Drawing Sheets

OTHER PUBLICATIONS

Patent and Trademark Office, Office Action mailed Oct. 21, 2003, for U.S. Appl. No. 09/838,905.
Patent and Trademark Office, Office Action mailed Apr. 16, 2003, for U.S. Appl. No. 09/838,905.
Patent and Trademark Office, Office Action mailed Dec. 2, 2002, for U.S. Appl. No. 09/838,905.
Patent and Trademark Office, Office Action mailed Jun. 4, 2002, for U.S. Appl. No. 09/838,905.
Patent and Trademark Office, Office Action mailed Oct. 10, 2006, for U.S. Appl. No. 09/838,905.
Patent and Trademark Office, Office Action mailed Jun. 14, 2006, for U.S. Appl. No. 10/737,336.
Patent and Trademark Office, Office Action mailed Sep. 9, 2005, for U.S. Appl. No. 10/737,336.
Patent and Trademark Office, Office Action mailed Mar. 4, 2005, for U.S. Appl. No. 10/737,336.
Patent and Trademark Office, Office Action mailed Sep. 29, 2004, for U.S. Appl. No. 10/737,336.
Patent and Trademark Office, Office Action mailed May 25, 2007, for U.S. Appl. No. 10/958,807.
Patent and Trademark Office, Office Action mailed Dec. 29, 2006, for U.S. Appl. No. 10/958,807.
Patent and Trademark Office, Office Action mailed Oct. 3, 2006, for U.S. Appl. No. 10/958,807.
Patent and Trademark Office, Office Action mailed May 10, 2006, for U.S. Appl. No. 10/958,807.
Patent and Trademark Office, Office Action mailed May 4, 2005, for U.S. Appl. No. 09/973,247.
Patent and Trademark Office, Office Action mailed Jun. 11, 2008, for U.S. Appl. No. 11/468,895.

* cited by examiner

STRAIN MEASUREMENT METHOD AND DEVICE

BACKGROUND OF THE INVENTION

The present invention relates to a strain measurement method and a device therefor for a test piece such as plastic, rubber, or metal as well as other structures, structural materials, and the like.

Prior Art

When a pulling load (tension) is applied to a test piece or some other measurement object such as a structure or a structural material (hereinafter, simply referred to as a test piece) when measuring the test piece, the test piece has the characteristic that it stretches in the direction the pulling weight is applied (vertically), and shrinks in the middle (horizontally). The Poisson's ratio is found from the vertical stretching (%) and the horizontal shrinkage (%). The Poisson ratio formula is as follows:

Poisson's ratio=|horizontal strain (%)|/|vertical strain (%)|

When continuously finding Poisson's ratios with a pulling load continuously applied to a test piece, a wire resistance strain gauge is generally affixed to the text piece to calculate the Poisson's ratio from the change in resistance.

Also, a method exists using sound waves to determine the change in the transmission time for sound waves by adding a transmitting oscillation element and a receiving element to the test piece.

SUMMARY OF THE INVENTION

Problem to be Solved by the Invention

For measurement methods using a wire resistance strain gauge, the wire resistance strain gauge is attached to the test piece in preparation for measurement. Expertise is required to provide the necessary care to the direction and strength of attachment to the measurement location. During measurements, the wire resistance strain gauge may become dislocated if cracks or breaks occur in the test piece, which may cause damage or breakdown. The range of measurement is restricted to the range of measurement of the wire resistance strain gauge, such that this method may be unsuited for measurement up to the point of breakage of materials with a large rate of stretching such as rubber and plastic.

Methods using sound waves require attachment of a contact medium between the oscillation, transmitting, and receiving elements and the test piece and that both surfaces of the test piece be parallel.

Means to Solve the Problem

According to the present invention, a strain measurement method and device are provided that are easy and accurate but do not require complicated surface preparation. When laser beam light with superior linearity, brightness, wave shortness, and interference is irradiated onto a test piece, the light is reflected diffusely by the rough irradiation surface of the test piece, and a characteristic striping pattern is generated in space. This characteristic striping pattern is referred to as a laser spectral pattern and has the characteristic of parallel movement when there is stretching, deformation, or movement of the test piece. According to the present invention, this characteristic of laser spectral patterns is used to measure the strain of a test piece with accuracy and contact-free without requiring surface preparation.

The strain measurement method of the present invention uses laser spectral patterns and measures a Poisson's ratio of a test piece in real time without physical contact with the test piece. This method also has a wide measurement range, extending up until the point when cracks or breaks occur in the test piece. The strain measurement method of the present invention further measures the Poisson's ratio without affecting the shape or surface form of the test piece.

Effect of the Invention

According to the present invention, measurement can be made immediately by merely irradiating laser beam light on a test piece without requiring preparation and without applying an excess load, such as the attachment of a wire resistance strain gauge on the test piece, because of the non-contact measurement system used. Continuous measurement can be made until the test piece cracks or breaks by using the measurement system to follow the measurement point of the test piece. Also, the measurement range may be freely set. When acoustic devices are used, both surfaces of the test piece need to be parallel. Measurement according to the present invention, however, can be made without affecting the shape or surface form of the test piece.

These and other features, objects and advantages of the present invention will become apparent upon reading the following description thereof together with reference to the accompanying drawings.

DETAILED DESCRIPTION OF THE PREFERRED EMBODIMENT

Figure 1:
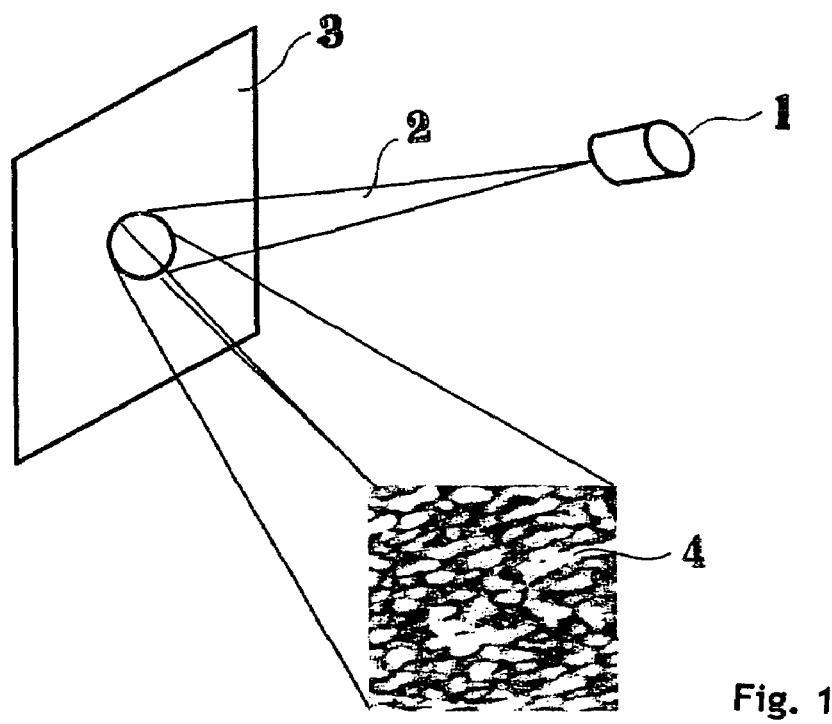
FIG. 1 is a pictorial view showing spectral pattern generation.

FIG. 1 shows the generation of a spectral pattern 4. In the drawing, the granular spot pattern 4 is generated over the entire surface in the space in front of a test piece 3 when the rough surface thereof is irradiated by a laser light projector 1.

Figure 2:
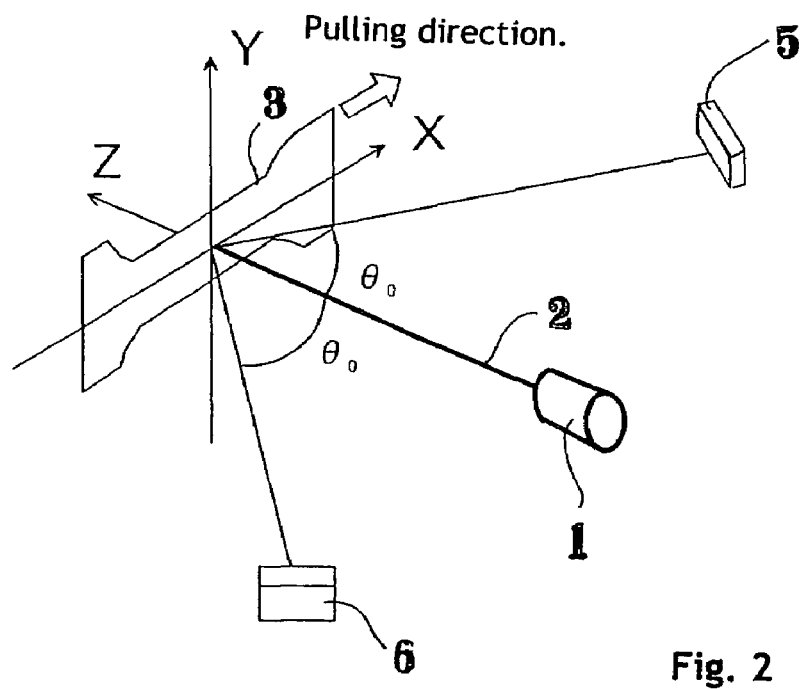
FIG. 2 is a schematic view showing the system for strain measurement according to the present invention.

The system of measurement is shown in FIG. 2, where a laser beam light 2 from the laser projector 1 is directed onto the surface of test piece 3. The laser beam light 2 is reflected diffusely according to the rough surface of the irradiated test piece 3, and the spectral pattern 4 is generated in space. This spectral pattern is continuously filmed by two spaced-apart CCD (charge coupled device) cameras 5 and 6.

When a pulling (tensile) load is applied to the test piece 3, the spectral pattern 4 moves in the direction of stretching of the test piece 3 in proportion thereto, and the quantity of movement of the spectral pattern 4 before the load is applied and when it is applied is calculated in real time with image processing. The movement quantity of the spectral pattern 4 filmed by the two CCD cameras 5 and 6 can be used to measure the strain in the direction of stretching. This is expressed by the formula:

$$\varepsilon_{xx} = -\frac{\Delta A_x}{2L_0 \tan\theta_0} = -\frac{7.8 \times 10^{-6}}{2 \times 0.4 \times \tan 20} = -27.08 \times 10^{-6}$$

where: $\varepsilon_{xx}$: strain $\Delta A_x$: movement quantity (unit: m)

$L_0$: Distance to CCD camera: 0.4 m $\theta_0$: Camera angle: 20 degrees 27.08 μ strain is the minimum resolution This formula is for measuring the vertical strain in the direction of stretching. The horizontal strain in the direction perpendicular to the stretching direction is measured simultaneously, and the horizontal strain is divided by the vertical strain to find the Poisson's ratio.

Example of Embodiment

Figure 3:
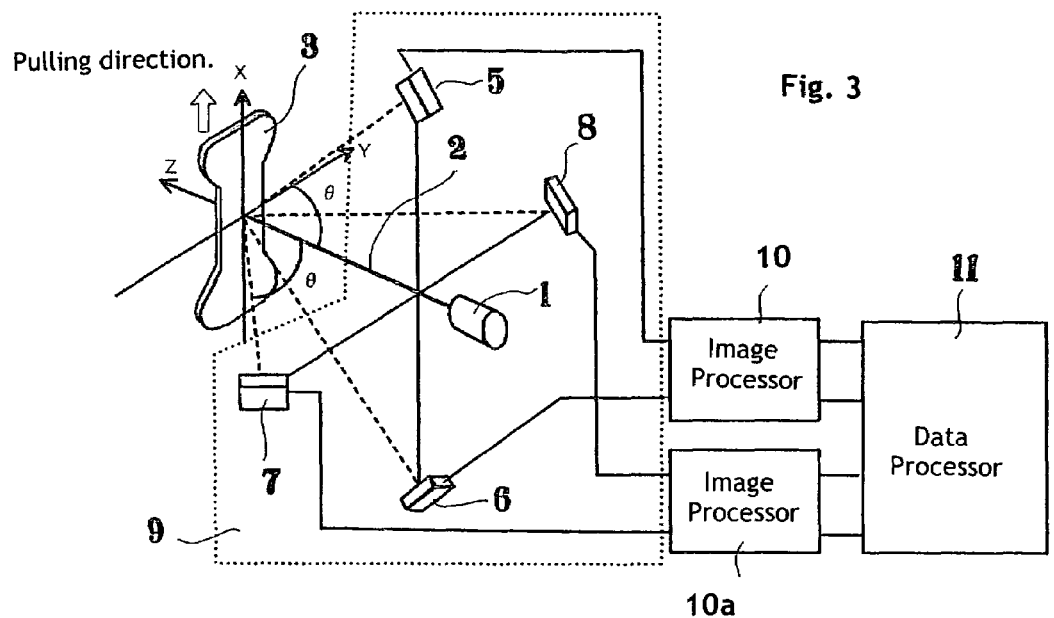
FIG. 3 is a block and schematic view showing an example of one embodiment of the invention.

An example of one embodiment of the present invention is shown in FIG. 3. In the drawing, the laser beam light 2 outputted from the laser projector 1 is perpendicularly irradiated on the test piece 3. The laser beam light 2 irradiated on the test piece 3 reflects diffusely according to the rough surface of the test piece 3, and a spectral pattern 4 is generated in front of the test piece 3. Four CCD cameras (5, 6, 7, and 8) are positioned, each equidistant from the test piece 3 and in a square pattern, for continuously filming the spectral pattern 4. When a pulling load is applied to the test piece 3 in this state, the spectral pattern 4 moves as the test piece 3 stretches, and image processing devices 10, 10a, respectively, calculate the change (vertical strain) in spectral pattern movement as filmed by the CCD camera 5 and the CCD camera 6, as well as the change (horizontal strain) in spectral pattern movement as filmed by a CCD camera 7 and a CCD camera 8 in real time. The signals from processing devices 10, 10a representing the vertical strain and the horizontal strain are inputted to a data processing device 11 for calculating the Poisson's ratio in real time by dividing the horizontal strain by the vertical strain.

Figure 4:
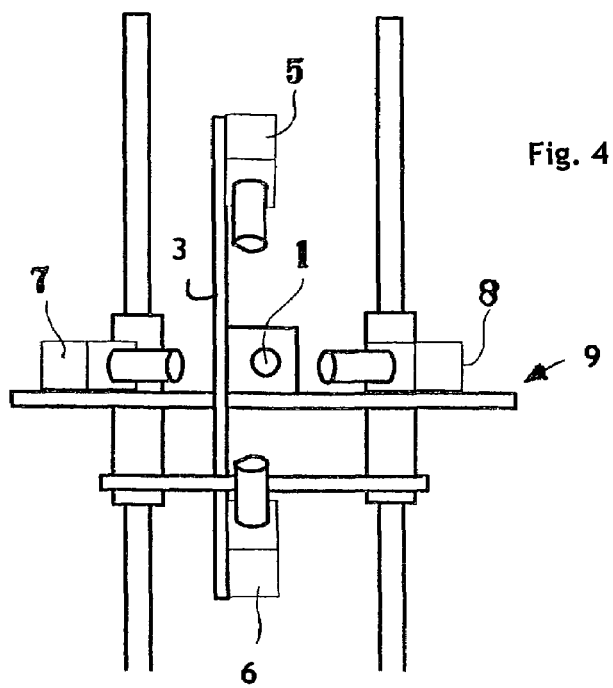
FIG. 4 is a side elevational view showing an automatic tracking mechanism for a measurement system of the present invention.

An automatic tracking mechanism 9 for a measurement system is shown in FIG. 4. In the drawing, it is possible to always measure the same portion of the test piece 3, as well as continuously measure the Poisson's ratio, until cracks or breaks occur in the test piece 3 by tacking a measurement system 9 with the CCD camera 5 and the CCD camera 6 for the stretching direction of the spectral pattern 4 filmed before the pulling load was applied to the test piece 3.

Figure 5:
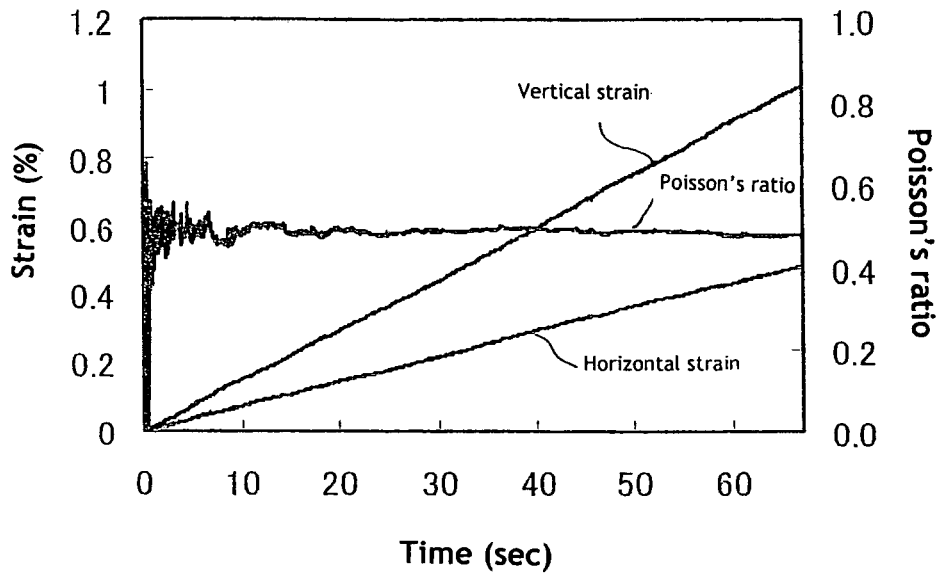
FIG. 5 is a graph showing an example of a Poisson's ratio measurement.
Figure 6:
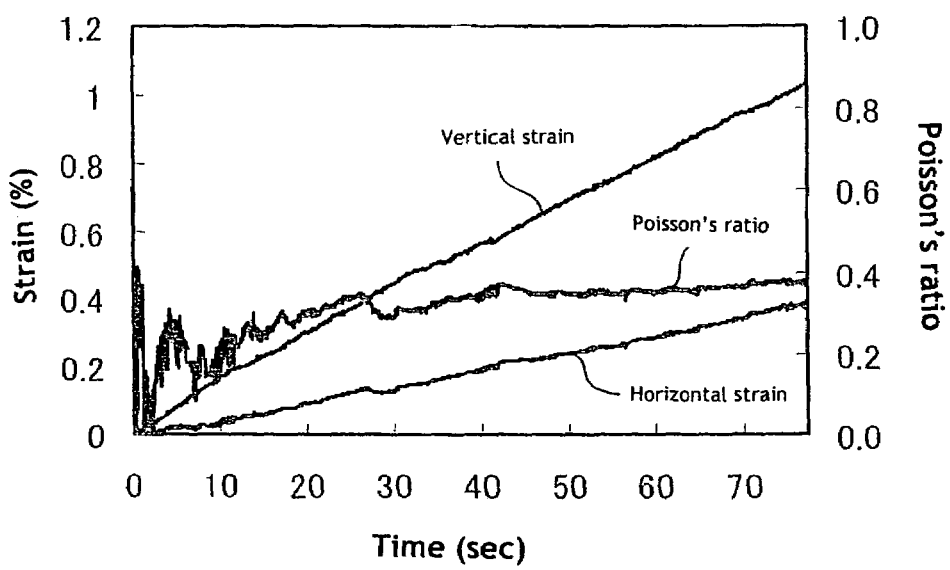
FIG. 6 is a graph also showing an example of a Poisson's ratio measurement.

FIGS. 5 and 6 show examples of measuring Poisson's ratios. FIG. 5 shows an example of a rubber test piece measurement, and FIG. 6 shows an example of a plastic test piece measurement.

It will become apparent to those skilled in the art that various modifications to the preferred embodiment of the invention as described herein can be made without departing from the spirit or scope of the invention as defined by the appended claims.

The invention claimed is:

1. A strain measurement method for a test piece for determining the Poisson's ratio of a test piece in real time comprising the steps of:
    irradiating the surface of a test piece with a laser beam for generating a spectral pattern;
    viewing the changes in the spectral pattern with at least one CCD video camera as the test piece is placed under a tensile force and tracking said test piece during the application of the tensile force such that the same area of said test piece is being viewed by said at least one video camera;
    coupling an image processor to said at least one video camera; and
    coupling said image processor to a data processor for determining the Poisson ratio in real time as said test piece is placed under a tensile force.

2. The strain measurement method as defined in claim 1 wherein said viewing step includes monitoring the spectral pattern with a plurality of spaced-apart video cameras.

3. The strain measurement method as defined in claim 2 wherein said viewing step includes placing four CCD video cameras positioned to detect changes in vertical and horizontal directions of said spectral pattern.

4. The strain measurement method as defined in claim 1 wherein said measurement method includes programming said data processor to determine the Poisson ratio according to the following formula:

$$\varepsilon_{xx} = -\frac{\Delta A_x}{2L_0 \tan\theta_0}.$$

5. The strain measurement method as defined in claim 4 wherein said measurement method extends to the point where cracks appear in the test piece.

6. The strain measurement method as defined in claim 4 wherein said measurement method extends to the point where breaks appear in the test piece.

7. A strain measurement system for measuring the Poisson's ratio of a test piece in real time while applying a tensile force on said test piece comprising:
    a laser light source for directing a beam of energy onto a surface of a test piece for generating a spectral pattern;
    at least one video camera positioned for viewing the changes in said spectral pattern as a tensile force is applied to said test piece;
    a tracking system for said video camera such that said camera views the same area of said test piece during the application of the tensile force;
    an image processor coupled to said video camera; and
    a data processor coupled to said image processor and programmed to determine the Poisson's ratio in real time as said test piece is placed under a tensile force.

8. The strain measurement system of claim 7 wherein said video camera comprises a CCD camera.

9. The strain measurement system of claim 8 wherein a plurality of CCD cameras are positioned in spaced relationship for viewing said spectral pattern.

10. The strain measurement system of claim 9 wherein four CCD video cameras are positioned to detect changes in vertical and horizontal directions of said spectral pattern.

11. The strain measurement system of claim 7 wherein said data processing circuit calculates the Poisson ratio according to the following formula:

$$\varepsilon_{xx} = -\frac{\Delta A_x}{2L_0 \tan\theta_0}.$$

12. A strain measurement method for measuring the Poisson's ratio of a test piece in real time without contacting said test piece comprising:

generating a spectral pattern in front of a test piece by irradiating a test piece perpendicularly with a laser beam from a laser projector;

positioning two CCD cameras with respect to said test piece, each at an equidistance from a perpendicular position respectively in front of said test piece and toward said test piece;

positioning an additional two CCD cameras each at an equidistance from a horizontal position respectively in front of said test piece and toward said test piece, wherein the two CCD cameras at the perpendicular position calculate a change (vertical strain) in spectral pattern movement in real time and, at the same time, the two additional CCD cameras at the horizontal position calculate a change (horizontal strain) in spectral pattern movement in real time; and inputting the vertical strain and the horizontal strain information into a data processing device where the Poisson's ratio is measured by dividing the horizontal strain by the vertical strain without contacting said test piece.

13. The strain measurement method as defined in claim 12 and further including the step of tracking said test piece during the application of the tensile force such that the same area of said test piece is being viewed by said at least one video camera.

14. The strain measurement method as defined in claim 12 wherein the measurement is made in a range which extends to the point where cracks and breaks appear in said test piece.

15. The strain measurement method as defined in claim 12 wherein the Poisson's ratio is measured without being affected by the shape or the surface state of said test piece.

16. A strain measurement device for measuring a Poisson's ratio of a test piece in real time without contacting the test piece comprising:

a laser projector positioned in front of the test piece, such that a laser beam outputted from said laser projector is irradiated perpendicular to said test piece to provide a spectral pattern in front of said test piece by diffused reflection of said laser beam light by said test piece;

two CCD cameras positioned with respect to said test piece, each at an equidistance from a perpendicular position respectively in front of said test piece and toward the test piece;

two additional CCD cameras positioned with respect to said test piece, each at an equidistance from a horizontal position respectively in front of said test piece and toward said test piece;

wherein said two COD cameras at the perpendicular position are provided at a tracking mechanism for tracking the vertical movement of said test piece and calculate a change (vertical strain) in spectral pattern movement in real time, and, at the same time, the two additional CCD cameras at the horizontal position calculate a change (horizontal strain) in spectral pattern movement in real time; and a data processing device coupled to said CCD camera to receive the calculated vertical strain and horizontal strain, whereby the Poisson's ratio is measured by dividing the horizontal strain by the vertical strain without contacting said test piece.

17. The strain measurement method as defined in claim 16 and further including a tracking system for said video camera such that said camera views the same area of said test piece during the application of the tensile force.

18. The strain measurement device as defined in claim 16 wherein the Poisson measurement is made in a range which extends to the point where cracks and breaks appear in said test piece.

* * * * *

UNITED STATES PATENT AND TRADEMARK OFFICE
CERTIFICATE OF CORRECTION

PATENT NO. : 7,487,685 B2 Page 1 of 1
APPLICATION NO. : 11/513934
DATED : February 10, 2009
INVENTOR(S) : Koichi Kobayashi It is certified that error appears in the above-identified patent and that said Letters Patent is hereby corrected as shown below:

Title Page, Item (73) Assignee: After "Kabushiki Kaisha" insert --Toyoseikiseisakusho--;

Column 1, line 27, "text" should be --test--;

Column 4, Claim 1, lines 6-7, "determine" should be --determining--; and

Column 6, Claim 16, line 14, "COD" should be --CCD--.

Signed and Sealed this

Seventh Day of April, 2009

JOHN DOLL
*Acting Director of the United States Patent and Trademark Office*